July 10, 1951 — H. T. BURDICK — 2,560,530
SHEET METAL SNAP FASTENER
Filed Sept. 25, 1947
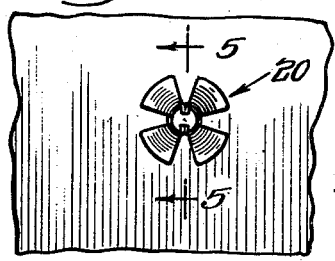
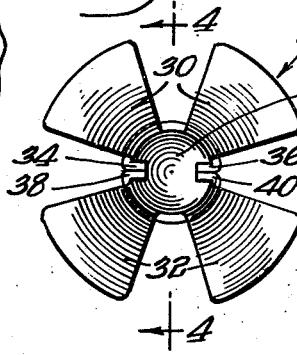
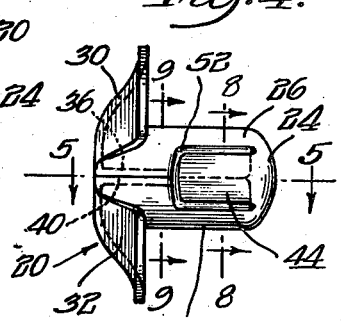
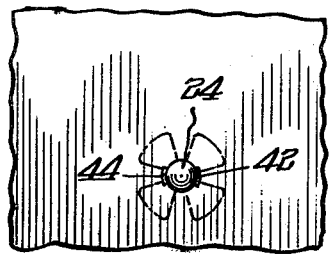
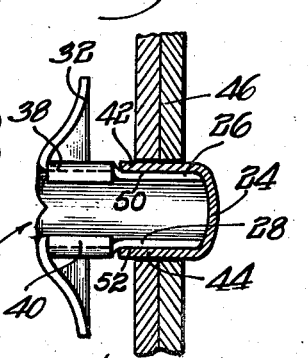
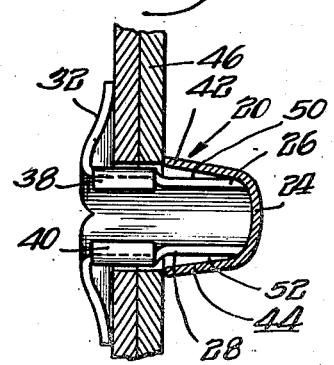
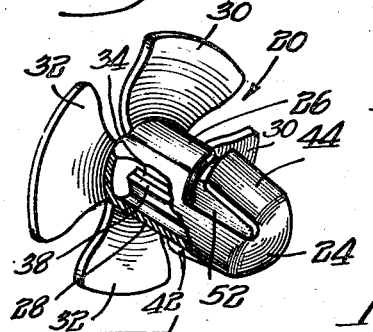
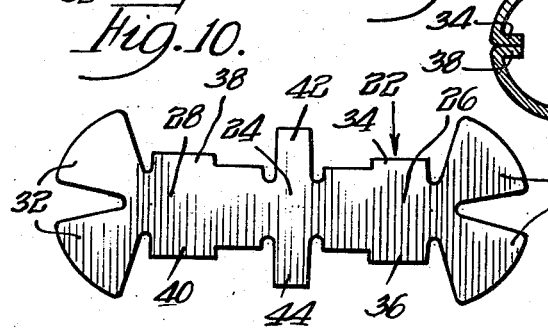
INVENTOR.
Hugh T. Burdick
BY Moore, Olson & Trexler
attys.

Patented July 10, 1951

2,560,530

UNITED STATES PATENT OFFICE 2,560,530

SHEET METAL SNAP FASTENER

Hugh T. Burdick, Chicago, Ill., assignor to Illinois Tool Works, Chicago, Ill., a corporation of Illinois Application September 25, 1947, Serial No. 776,107

2 Claims. (Cl. 85—5)

This invention relates generally to fastening devices and more particularly to fastening devices formed from sheet metal stock adapted to be snapped into position within the aperture of a work piece.

More specifically, the present invention is concerned with the production of a fastening device of the tubular shank variety adapted for telescopic association with a work aperture and which is self-locking within the work piece upon reaching its final position of insertion. Fastening devices of the aforesaid type present certain problems in use which the present invention proposes to obviate. For example, tubular shanks made of sheet metal, and particularly those comprising two semi-cylindrical portions brought together in edge to edge abutting relation, have a tendency to become misaligned. That is to say, one semi-cylindrical half may become laterally displaced with respect to the other half, thereby seriously affecting the functional efficiency of the device. The present invention contemplates a fastening device in which a tubular shank or body portion is so formed that abutting margins of semi-cylindrical halves will always remain in firm, aligned, abutting relation.

It is not uncommon for fastening devices of the type referred to above to employ struckout wings or fingers which enable the fastener to be self-positioning or locking when finally driven home within a work aperture. As the shank portion moves through the aperture these wings or fingers are forced back into the openings from which they were struck, and as the fastener reaches the limit of its position of insertion the fingers are supposed to automatically spring outwardly into locking position. Not infrequently, when the fingers are forced inwardly as above stated, the sheared edges become interlocked with the complementary sheared edges of the tubular shank and hence the fingers will not spring outwardly into locking position as the fastener is driven home. It is an important object of the present invention to form a sheet metal fastening device in which binding or interlocking of the locking fingers as they are forced back into the confines of the tubular shank is positively precluded. To this end the fastener shank is so formed as to obviate the necessity of shearing wings or fingers from the body of the tubular shank.

It is a further object of the present invention to provide a fastener as set forth above in which the shank wall has a novel structural configuration which not only assures aligned abutting relation of complementary shank halves, but materially increases the transverse shear strength and longitudinal strength of the shank body.

It is a further object of the present invention to provide a sheet metal snap-in fastening device in which the shank portion provides a continuous or completely sealed peripheral area, thereby rendering the device particularly practical for use in instances where it is important to employ a fastener which will completely fill and seal a work aperture.

Still more specifically, it is an object of the present invention to provide a fastener having the advantages of shank construction referred to above, in association with a head at one extremity which is resilient and thereby cooperates with a locking protuberance on the shank firmly to secure the fastener in place after being driven or forced into the work aperture.

The foregoing and other objects and advantages will be more apparent from the following detailed description when considered in connection with the accompanying drawing, wherein:

Figure 1 is a plan view of the fastener applied to a work piece;

Figure 2 is a view of the underside of the fastener as shown in Figure 1;

Figure 3 is an enlarged end view of the fastener shown in Figure 1;

Figure 4 is a side view of the fastener as viewed from the right of Figure 3;

Figure 5 is a sectional view of the fastener taken along the line 5—5 of Figure 1 and showing the fastener before complete insertion into the work aperture of a work piece;

Figure 6 is a sectional view similar to Figure 5 showing the fastener in operative position relative to the work piece;

Figure 7 is a perspective view of the fastener with a portion of the shank broken away in order more clearly to illustrate structural characteristics of the tubular shank;

Figure 8 is a cross sectional view of the fastener shank taken along the line 8—8 of Figure 4;

Figure 9 is a cross sectional view of the fastener shank taken along the line 9—9 of Figure 4;

Figure 10 is a plan view of the blank from which the fastener shown in Figures 1 to 9 is formed; and Figure 11 is a perspective view of a modified embodiment of the fastener with a portion of the shank broken away.

The fastener 20 of the present invention is comprised of a strip of metal 22 bent adjacent its midportion to form a nose portion 24. Concaved complementary body portions 26 and 28 extend from the nose portion 24, the material of strip 22 being bent outwardly adjacent the extremity of the free end of the strip to form head portions 30 and 32. The head portions 30 and 32 disclosed in Figures 1 to 9 are resilient and when flexed serve to exert axial tightening force as shown in Figure 6.

The body portions 26 and 28 are provided with inturned longitudinal flanges 34, 36, 38 and 40 which extend a desired distance along the longitudinal axis of the shank body. These longitudinal flanges 34 and 38, and 36 and 40, respectively, are designed to lie in abutting relation when the concaved complementary body portions 26 and 28 are drawn together to form the shank of the fastener 20. These longitudinal flanges increase the abutting area of the shank portions 26 and 28 and help to prevent collapse of the shank when it is subjected to transverse shear stresses. These flange portions 26 and 28 can be made to extend various lengths along the fastener shank depending on the use of the fastener in each particular application. In the embodiment shown in Figures 1 to 10, the longitudinal flange portions 34, 36, 38 and 40 extend only a portion of the length of the shank, although it should be noted in Figure 11 that these flanges extend substantially the entire length of the shank body. This feature of construction in the embodiment shown in Figure 11 will be described in more detail later.

I have provided the fastener 20 with resilient wings or fingers 42 and 44 extending from the nose portion 24 toward the head portions 30—32. These resilient fingers or protuberances 42 and 44 have their free ends in opposed relation to head portions 30 and 32 and are adapted to engage the wall of the work piece 46 opposite from said head portions when the fastener shank has been inserted completely into the work aperture. These wings 42 and 44 are adapted to overlie the material forming the shank of the fastener, as illustrated in Figure 8. In this connection it will be noted that the material of the shank is depressed to provide recesses 50 and 52, the material in that vicinity being positioned immediately beneath the resilient wings 42 and 44 to permit them when in collapsed position to lie within the diameter of the periphery of the shank formed by the body portions 26 and 28. Such an arrangement permits ready collapse of the resilient wings 42 and 44 in association with an unbroken or continuous shank which adds materially to the shear strength. Furthermore, such design provides a shank presenting a substantially unbroken cup for better sealing the work aperture into which the fastener 20 is inserted. The combination of the recesses 50 and 52 of the shank and resilient wing portions 42 and 44 is best seen in Figure 5 wherein the wings are shown in collapsed position and seated within the recesses 50 and 52. In Figure 6 the wings 42 and 44 are shown after having passed through the work aperture and expanded from the recessed portions 50 and 52, respectively, into interlocking engagement with the work surface oppositely disposed from the head.

In Figure 10 I have shown the blank 22 of the fastener disclosed in Figs. 1 to 9. Various portions have been numbered to correspond with the numerals used in Figs. 1 to 9.

It will be seen that the blank 22 may be stamped from flat stock by the use of conventional stamping methods, and said blank subsequently may be formed into the complete structure shown in the drawing. It will also be apparent from the foregoing description that the aforesaid blank enables a fastener to be produced therefrom in which a tubular shank portion is completely sealed along its periphery and at its entering extremity. Furthermore, the inturned flanges 34—38 and 36—40 extending in abutting relation over a substantial axial extent of the shank make for transverse and longitudinal rigidity. By having the aforesaid flanged abutments absolute uniformity in axial alignment of the shank halves is assured. Also, by having the material of the shank extend beneath each of the wings or fingers 42—44, as clearly shown in Fig. 8, this area is sealed. Furthermore, by employing the depressions 50—52, as distinguished from conventional struck out portions which have heretofore been used, the fingers 42—44 cannot possibly become interlocked with the shank stock as they are forced inwardly to the positions shown in Fig. 5 during the initial insertion of the fastener within the work aperture.

In Fig. 11 I have disclosed another embodiment of the present invention, incorporating in a slightly different manner the features heretofore described. The fastener is designated generally by the numeral 20a and includes a nose portion 24a, concaved body portions 26a and 28a, and rigid head portions 30a and 32a. Rigid head portions are preferable where the fastener is not designed to accommodate various thicknesses of material. Recessed portions 50a and 52a are provided so that the wings 42a and 44a may be collapsed therein upon insertion of the fastener into a work piece. Inwardly extending flanges 34a, 36a, 38a and 40a are provided along the longitudinal edges of the body portions 26a and 28a for purposes heretofore disclosed. It should be noted that these portions in this embodiment extend substantially for the entire length of the shank of the body to provide maximum strength to the body so as to prevent collapse of the shank portion when transverse shear stresses are present.

It will be apparent from the foregoing description that the fastener 20a, like the fastener 20, is so formed as to prevent the wings or resilient fingers 42—44a from becoming interlocked or wedged within the fastener shank. By having the inturned flanges extend substantially the length of the fastener, as illustrated in Fig. 11, maximum transverse and longitudinal shank strength is assured. Also, the closed end and continuous abutting relationship of the adjacent longitudinal margins of the shank stock provide an effective sealed construction similar to that shown in Figs. 1 to 9, inclusive.

While certain features of construction have been described herein for the purpose of illustrating practical embodiments of the invention, it will be apparent that other modifications and changes may be made without departing from the scope of the appended claims.

The invention is hereby claimed as follows:

1. A sheet metal fastener including a tubular shank formed of a pair of oppositely concaved elongated sheet metal shank sections joined at their entering ends by an imperforate nose portion and adapted to abut along their complementary longitudinal margins, a head portion extending laterally from said shank at the opposite end thereof for engaging one side of a work structure, resilient latching members formed integral with and extending from said connecting nose portion toward said head and normally projecting beyond the periphery of the tubular shank for engaging the side of a work structure oppositely disposed from the fastener head but capable of being flexed inwardly when telescopically associated with a work aperture, and a portion of the periphery of said tubular shank inwardly indented a sufficient amount to permit a complementary latching member to be forced into alignment with the shank periphery during the passage of said shank through a work aperture, the material of the shank defining said indentation closing the area of the shank underlying said latching member and including portions of said abutting shank margins.

2. A sheet metal fastener in accordance with claim 1, wherein at least portions of the abutting margins of the elongated shank members consist of radially extending flanges which assure abutting alignment and increased shank strength.

HUGH T. BURDICK.

REFERENCES CITED

The following references are of record in the file of this patent:

UNITED STATES PATENTS

| Number | Name | Date |
|---|---|---|
| 1,131,085 | Reilly | Mar. 9, 1915 |
| 1,303,502 | Rundell | May 13, 1919 |
| 2,244,975 | Tinnerman | June 10, 1941 |
| 2,391,298 | Davis | Dec. 18, 1945 |
| 2,408,340 | Poupitch | Sept. 24, 1946 |
| 2,430,809 | Flora | Nov. 11, 1947 |